US008501316B2

(12) United States Patent
Laprade et al.

(10) Patent No.: US 8,501,316 B2
(45) Date of Patent: Aug. 6, 2013

(54) PROCESS FOR PRINTING WAX RELEASE LAYER

(75) Inventors: Jean-Paul Laprade, N. Smithfield, RI (US); Gary McFarland, Norfolk, MA (US)

(73) Assignee: Multi-Color Corporation, Batavia, OH (US)

( * ) Notice: Subject to any disclaimer, the term of this patent is extended or adjusted under 35 U.S.C. 154(b) by 0 days.

(21) Appl. No.: 13/591,308

(22) Filed: Aug. 22, 2012

(65) Prior Publication Data

US 2012/0321860 A1 Dec. 20, 2012

Related U.S. Application Data

(63) Continuation of application No. 11/764,504, filed on Jun. 18, 2007, now Pat. No. 8,268,443.

(51) Int. Cl.
*B32B 7/12* (2006.01)
*B41M 5/40* (2006.01)

(52) U.S. Cl.
USPC .... 428/343; 428/32.6; 428/32.77; 428/32.79; 428/348; 428/349

(58) Field of Classification Search
None
See application file for complete search history.

(56) References Cited

U.S. PATENT DOCUMENTS 4,313,994 A 2/1982 Kingston
4,536,434 A 8/1985 Magnotta
4,548,857 A 10/1985 Galante
4,726,979 A 2/1988 Chapman
4,770,733 A 9/1988 Chapman
8,268,443 B2 * 9/2012 Laprade et al. ............... 428/343

OTHER PUBLICATIONS

Office Action mailed Dec. 22, 2010 in corresponding U.S. Appl. No. 11/764,504 (U.S. Patent No. 8,268,443).
Office Action mailed May 24, 2011 in corresponding U.S. Appl. No. 11/764,504 (U.S. Patent No. 8,268,443).
Office Action mailed Aug. 9, 2011 in corresponding U.S. Appl. No. 11/764,504 (U.S. Patent No. 8,268,443).
Office Action mailed Dec. 27, 2011 in corresponding U.S. Appl. No. 11/764,504 (U.S. Patent No. 8,268,443).
Office Action mailed Jun. 1, 2012 in corresponding U.S. Appl. No. 11/764,504 (U.S. Patent No. 8,268,443).

* cited by examiner

*Primary Examiner* — Sheeba Ahmed
(74) *Attorney, Agent, or Firm* — Wood, Herron & Evans, LLP

(57) ABSTRACT

A wax printing process, apparatus, formulation, and label. The process includes contacting a wax formulation with a surface having at least one etched region thereon, and confronting a carrier with the surface such that at least a portion of the wax transfers from the etched surface to the carrier. The apparatus includes a tray and a manifold positioned in the tray. In another aspect, the apparatus includes a gravure sleeve and a heatable mandrel disposed inside the gravure sleeve. The wax formulation includes a paraffin wax, an ester wax, a hydrocarbon resin, a microcrystalline wax, and an ethylene-vinyl acetate copolymer resin. The label includes a carrier and a wax release layer confronting a surface of the carrier. The wax release layer confronts less that the entire surface of the carrier.

16 Claims, 5 Drawing Sheets

PROCESS FOR PRINTING WAX RELEASE LAYER

CROSS-REFERENCE TO RELATED APPLICATIONS

The present application is a continuation application of, and claims priority to, U.S. patent application Ser. No. 11/764,504, titled "Process for Printing Wax Release Layer" and filed on Jun. 18, 2007, the disclosure of which is hereby incorporated by reference herein in its entirety.

FIELD OF THE INVENTION

The present invention relates generally to labels, and relates more specifically to the wax component used as a release layer of various labels, including heat transfer labels.

BACKGROUND

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

Heat transfer labels are commonly used in the decorating and/or labeling of commercial articles, such as, without limitation, containers for beverages, essential oils, detergents, adverse chemicals, and health and beauty aids. Such articles may include polyethylene, high-density polyethylene (HDPE), low-density polyethylene (LDPE), PET, acrylonitrile, and polypropylene articles. In heat transfer labeling, an ink design overlying a release layer on a carrier (generally referred to as a "carrier web" or "carrier sheet") is brought into contact with an article to be labeled. When heat is applied to the label, the release layer permits the ink design to be transferred to the article. The release layer may accomplish this by softening and/or becoming molten upon the application of heat, to permit transfer of the ink design. Typically, the release layer is a coating of wax, which is flood coated over one entire side of the carrier, and may serve as a protective layer for the ink design.

Thus, heat transfer labels are multilayered laminates, with each layer having its own function. Heat transfer labels generally include an adhesive layer, an ink design layer, and a release layer (alternatively, an adhesive may be incorporated into the ink design layer, rather than having a separate adhesive layer). The release layer may be a wax release layer, as described above, and is often directly adjacent a surface of the carrier. Thus, the label may be thought to include a "support portion" (e.g., carrier and release layer) and a "transfer portion" (e.g., ink design layer and optional adhesive layer). When subjected to heat, the wax release layer softens, thereby allowing the transfer portion to be separated from the support portion, and the adhesive layer (or adhesive in the ink) adheres the ink design layer to an article being labeled. During this label application, all or part of the wax release layer may transfer with the transfer portion, as well. When some or all of the wax transfers, it may provide protection to the ink design layer. Additionally or alternatively, heat transfer labels may include a separate protective layer (as part of the transfer portion) overlying the ink design layer to protect the ink design layer from abrasion following transfer to an article.

Heat transfer labels are generally provided as a roll or web of labels. During the heat transfer labeling process, the web of labels is subjected to heat, and the label is pressed onto an article with the adhesive layer making direct contact with the article as the web moves past the article (the ink design layer may also make contact with the article, as the adhesive may be part of, and mixed in with the ink of, the ink design layer). As the label is subjected to heat, the wax of the release layer begins to soften and melt so that the transfer portion can be released from the carrier. And, as described above, a portion of the wax release layer may be transferred with the ink design layer. After transfer of the ink design layer to the article, the carrier is removed, leaving the ink design layer firmly adhered to the article. Any portion of the wax release layer that also transfers to the article may serve the purpose of forming a protective layer over the transferred ink design layer. After transfer to the article, any transferred portion of the wax release layer may be subjected to a postflaming technique, which enhances the optical clarity of the wax (thereby enabling the ink design layer therebeneath to be better observed). Such a postflaming process also enhances the protective properties of any transferred wax.

In a typical heat transfer labeling process, the carrier (e.g., sheet of paper) is flood-coated (i.e., substantially entirely coated) with the wax release layer on one side thereof, whereas the ink design layer is printed onto only a portion of the wax release layer. One example of a heat transfer label that has been used to decorate polyethylene (PE) containers includes a paper carrier sheet flood-coated with a wax release layer (approximately 6-8 lbs. wax/3,000 square feet of paper carrier). A protective lacquer layer including a polyester resin is printed on the wax release layer. An ink design layer including a polyamide resin is printed on the protective lacquer layer. A heat-activatable adhesive layer including a polyamide resin is printed on the ink design layer.

The use of a wax flood-coated carrier has at least three disadvantages. First, the application of heat during the transfer process can cause a film of wax to be transferred and deposited over the entire region where the carrier contacts the article being labeled. The deposited wax has a random configuration and is frequently much larger than the ink design, resulting in an expanded and irregular wax "halo" surrounding the design print. This results in a labeled article having an objectionable appearance.

Second, because the ink design is printed only on a portion of the flood-coated wax release layer, the use of such a flood-coated carrier results in a large amount of unused, and thus excess, wax during the labeling process. The use of this excessive amount of wax results in increased costs to the labels. Flood coatings of wax are used for at least two reasons: (1) suppliers of the carrier do not know in advance what ink designs will be applied thereto, and (2) the wax has a high viscosity that does not allow it to be placed on the carrier in a patterned form. More specifically, the label-maker generally does not apply the wax release layer to the carrier itself. Rather, carriers are generally ordered from a supplier and the ink designs are printed thereon by the label-maker at a printing facility. Since the carrier suppliers do not know in advance what ink designs will be applied by the label-maker, they flood-coat the entire carrier with wax to allow for any size, shape, configuration, and registration of ink design. Further, neither the supplier nor the label-maker can apply the wax in a patterned form to a localized area of the carrier (i.e., less than substantially an entire side of the carrier) because the wax formulations used for the wax release layer have a relatively high viscosity, which makes applying a wax release layer that remains localized to a desired specific portion of the carrier difficult. More specifically, wax formulations having relatively high viscosities are difficult to print to a localized area of a carrier because such a wax formulation does not exhibit adequate flow properties, resulting in an unleveled wax release layer which does not exhibit desired performance characteristics. Thus, substantially an entire side of the carrier is flood-coated. The excess amount of wax results in increased cost of the carrier, and thus increased cost of label preparation and of the labels themselves.

Third, the wax release layer on a flood-coated carrier is prone to pinholes, voids, and picking up particulate matter during preparation and shipment of the carrier from the supplier to the printing facility. This results in a certain amount of carrier that cannot be used and must be discarded. This amount can typically be in the range of 15%-20%. Further, the flood coating of wax on the carrier also increases the overall weight of the carrier being shipped, and causes a greater thickness of the support portion (carrier and wax), which results in either (1) less carrier, and thus fewer labels, per roll, or (2) larger rolls of labels. These disadvantages ultimately increase the cost of producing each individual label due to increased waste and increased shipping costs.

SUMMARY

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

One aspect of the present invention provides a process for applying a wax release layer onto a carrier, wherein the wax release layer covers less than substantially the entire surface of a first side of the carrier. Thus, the wax release layer can be applied in a patterned form and/or can be applied to match any size, shape, configuration, or registration of an ink design that will confront the wax release layer. More specifically, this process may include contacting wax with a surface having at least one etched region thereon, and confronting a carrier with the surface such that at least a portion of the wax transfers from the surface to the carrier. The wax that transfers may particularly be received by and transferred from the etched region of the surface. Thus, the process may include (a) softening a wax formulation (such as by melting the wax formulation), (b) contacting the softened wax formulation with a gravure sleeve having at least one etched portion wherein the wax formulation is adsorbed onto the surface of the gravure sleeve, (c) removing excess wax from the surface of the gravure sleeve so the wax formulation is adsorbed only to the etched portion of the gravure sleeve, and (d) contacting the gravure sleeve with the carrier to deposit the wax formulation onto the carrier, thereby forming a wax release layer upon a portion of the carrier. An ink design can then be printed onto the wax release layer to form a heat transfer label having a support portion and a transfer portion (the label may also include an adhesive overlying or mixed into the ink design layer). The transfer portion of the label may be subsequently heat transferred onto an article.

Another aspect of the present invention provides an apparatus for applying the wax release layer to a carrier. The apparatus, in one aspect, includes a gravure sleeve and tray. The gravure sleeve is held at least partially within the tray and rotates at least partially therewithin, such that the outer surface of the sleeve can enter and exit an interior compartment defined by the walls of the tray. A manifold, which includes at least one pipe that is supplied with steam under pressure, is positioned in the bottom of the ink tray. The manifold may include a plurality of pipes. The steam supplied to the manifold increases the temperature of the manifold, and thus increases the temperature of the wax formulation, or maintains an already increased temperature of the wax formulation, which is placed in the gravure tray. Thus, the wax is softened such that it can be received by the surface having an etched region thereon.

In another aspect, the apparatus may include a heated mandrel that is disposed in the interior of the gravure sleeve. The mandrel may be hollow and adapted to receive steam within an interior cavity, thereby increasing the temperature of the mandrel. Thus, as the gravure sleeve rotates, the heated sleeve, due to the mandrel, ensures that the wax remains in a softened form as it rotates with the gravure sleeve.

Another aspect of the present invention provides a wax formulation used for the wax release layer. As described above, present wax formulations cannot be used other than in a flood-type coating because they have too high a viscosity. The present wax formulation is of a low viscosity, which allows printing the wax, and still retains the other benefits of the wax release layer. The wax formulation generally includes a paraffin wax, an ester wax, a hydrocarbon resin, a microcrystalline wax, and an ethylene-vinyl acetate copolymer resin. In one embodiment, the wax composition comprises paraffin wax in an amount of from about 15% to about 30% by weight, ester wax in an amount of from about 15% to about 35% by weight, a hydrocarbon resin in an amount of from about 15% to about 50% by weight, a microcrystalline wax in an amount of from about 2% to about 8% by weight, and an ethylene-vinyl acetate copolymer resin in an amount of from about 4% to about 10% by weight.

Another aspect of the present invention provides a label including a carrier and a wax release layer that confronts less than an entire surface of the carrier.

BRIEF DESCRIPTION OF THE FIGURES

Various features, aspects, and advantages of the present invention will become better understood when the following detailed description is read with reference to the accompanying figures in which like characters represent like parts throughout the figures, wherein.

DETAILED DESCRIPTION OF EXEMPLARY EMBODIMENTS

Figure 1A:
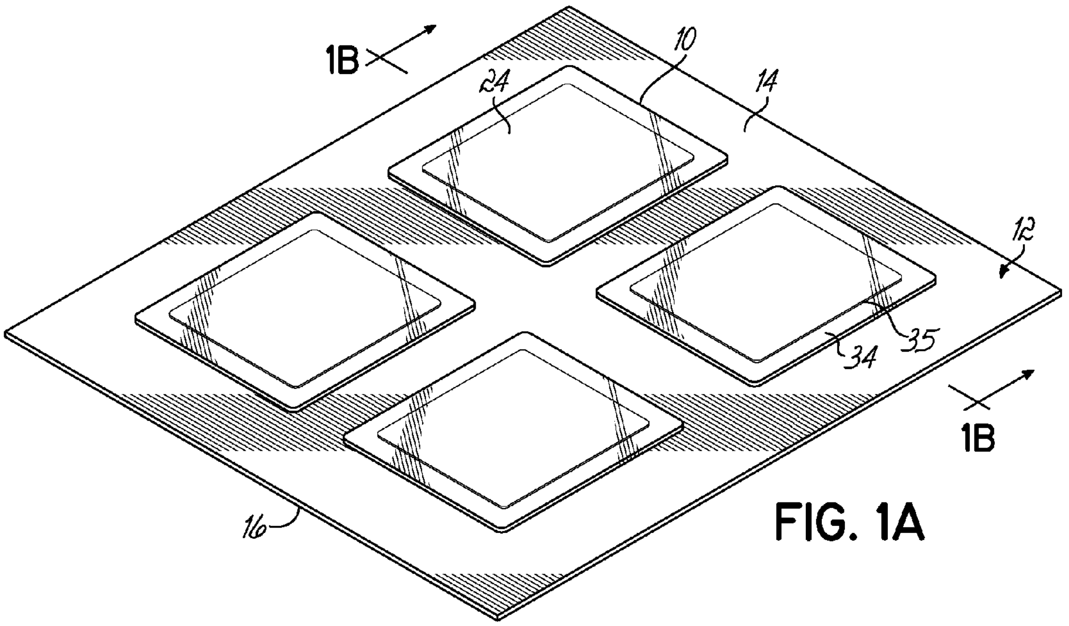
FIG. 1A is a perspective view of an example of heat transfer labels in accordance with the principles of the present invention.

One or more specific embodiments of the present invention will be described below. In an effort to provide a concise description of these embodiments, not all features of an actual implementation may be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, labels, such as heat transfer labels, are commonly used in the decorating and/or labeling of commercial articles. In heat transfer labeling, an ink design overlying a release layer on a carrier (generally referred to as a "carrier web" or "carrier sheet") is brought into contact with an article to be labeled. When heat is applied to the label, the release layer permits the ink design to be transferred to the article. The release layer may accomplish this by softening and/or becoming molten upon the application of heat, to permit transfer of the ink design. Typically, the release layer is a coating of wax, which is flood coated over substantially one entire side of the carrier, and may serve as a protective layer for the ink design. While the label referenced above and below may be a heat transfer label, for example, it will be recognized by those skilled in the art that the label may be any label that includes a wax layer.

Thus, and referring to the Figures, one aspect of the present invention provides a process for applying a wax release layer 10 onto a carrier 12, wherein the wax release layer 10 covers less than substantially the entire surface of one side of the carrier 12. A carrier 12 typically may be a sheet of paper or film having a first side 14 to which further label components may be applied, and a second side 16 opposite the first side 14. Thus, the wax release layer 10 can be applied to the first side 14 of the carrier 12 as a patterned form and/or can be applied to match any size, shape, configuration, or registration of an ink design relative to the carrier 12. This process includes contacting wax 17 with a surface 18 having at least one etched region 20 such that wax 17 transfers to the surface 18, and confronting the carrier 12 with the surface 18 such that at least a portion of the wax 17 transfers from the surface to the carrier 12. More specifically, the wax 17 that transfers may particularly be received by and transferred from the etched region 20 of the surface 18. Thus, the process may include (a) softening a wax formulation (such as by heating the wax formulation), (b) contacting the softened wax formulation with a sleeve 22, such as a gravure sleeve 22, having at least one etched portion wherein the wax formulation is adsorbed onto the surface 18 of the gravure sleeve 22, (c) removing excess wax 17 from the surface 18 of the gravure sleeve 22 so the wax formulation is adsorbed only to the etched region 20 of the gravure sleeve 22, and (d) confronting the carrier 12 with the gravure sleeve 22 to transfer the wax formulation to the carrier 12, thereby forming a wax release layer 10 upon a portion of the carrier 12, the portion being less than substantially the entire first side 14 of the carrier 12. An ink design 24 can then be printed onto the wax release layer 10 to form a label 26, such as a heat transfer label, having a support portion 28 and a transfer portion 30 (the label 26 may also include an adhesive overlying or mixed into the ink design layer 24). The transfer portion 30 of the label 26 may be subsequently heat transferred onto an article 32.

Figure 1B:
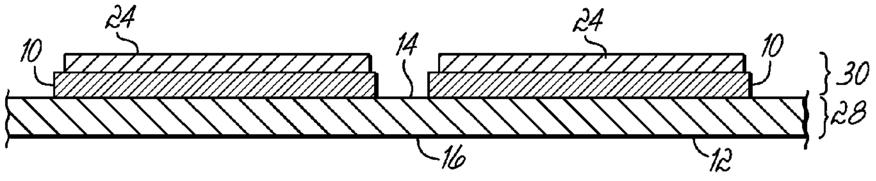
FIG. 1B is a cross-sectional view of the heat transfer labels of FIG. 1A, taken along lines 1B-1B of FIG. 1A.
Figure 1C:
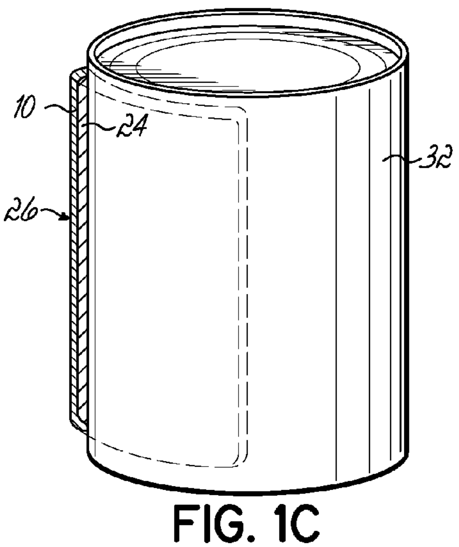
FIG. 1C is a perspective view showing a label (in cross-section) in accordance with the principles of the present invention affixed to an article.
Figure 2A:
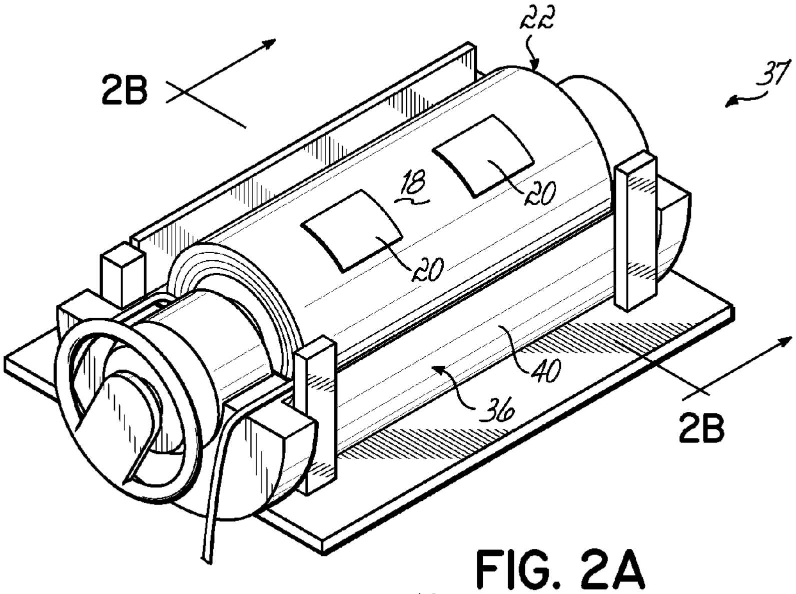
FIG. 2A is a perspective view of an apparatus in accordance with the principles of the present invention, including a gravure tray and sleeve.
Figure 2B:
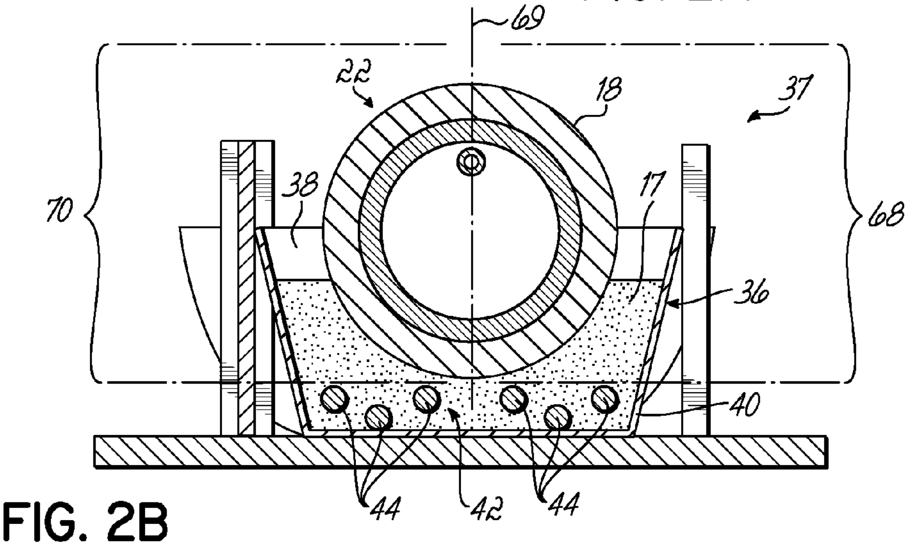
FIG. 2B is a cross-sectional view of the apparatus of FIG. 2A, taken along line 2B-2B of FIG. 2A.

Thus, a heat transfer label as shown in FIGS. 1A-1B in which a wax release layer 10 is applied to less than substantially the entire first side 14 of a carrier 12 is provided. The wax release layer 10 underlies an ink design layer 24 and, optionally, an adhesive layer (not shown) (as described above, any adhesive may alternatively be mixed in with, and be part of, the ink design layer 24). As a result, when the transfer portion 30 of the label 26 is brought into contact with an article 32 to be labeled, such as the illustrative article 32 of FIG. 1C, the transferred ink design 24 print may have the wax release layer 10 superimposed on it. The wax release layer 10 may be contoured to substantially the size and shape of the ink design layer 24. The contours 34 of the transferred wax release layer 10 may match the contours 35 of the ink design layer 24. Alternatively, the contours 34 of the transferred wax release layer 10 may extend beyond that of the ink design layer 24 to form a "halo" thereabout. Thus, the wax release layer 10 may also provide a margin with respect to the transferred ink design layer 24. This can serve to seal the ink design layer 24 and increase the mechanical and abrasive resistance of the decoration. It will be recognized by those skilled in the art that the contours 34 of the wax release layer 10 need not specifically match the contours 35 of the ink design layer 24 (regardless of the size of the wax release layer 10), but may be of any desired size, shape, configuration, or registration.

In order to achieve the contoured shape of the wax release layer 10, which allows for cost savings and more aesthetically pleasing labels, and referring now to FIGS. 2A-4, another aspect of the present invention provides an apparatus 37 for applying the wax release layer 10 to the carrier 12. The apparatus includes a sleeve 22 and tray 36. The sleeve 22 may be a gravure sleeve 22, for example, and the tray 36 may be amenable for use with the gravure sleeve 22. The gravure sleeve 22 is held proximate to, and at least partially within, the tray 36 and rotates such that an outer surface 18 of the sleeve 22 can enter and exit an interior compartment 38 defined by walls 40 of the tray 36 as the sleeve 22 rotates. A manifold 42 is positioned in the tray 36. The manifold 42 includes at least one pipe that is supplied with steam under pressure. In the illustrated embodiment, the manifold 42 includes a series of pipes 44 that are supplied with steam under pressure. Thus, the pipe or pipes 44 that comprise the manifold 42 include a steam inlet 46 at a first end 47 thereof and a steam outlet 48 at a second end 49 thereof. Steam is introduced to the manifold 42 via the steam inlet 46. The steam supplied to the manifold 42 increases the temperature of the manifold 42, and the radiant heat therefrom increases the temperature of the wax formulation, or maintains the already increased temperature of the wax formulation, which is in the tray 36. The increased temperature softens the wax 17 such that it can be received by a surface 18 of the sleeve 22 having an etched region 20 thereon.

Figure 3:
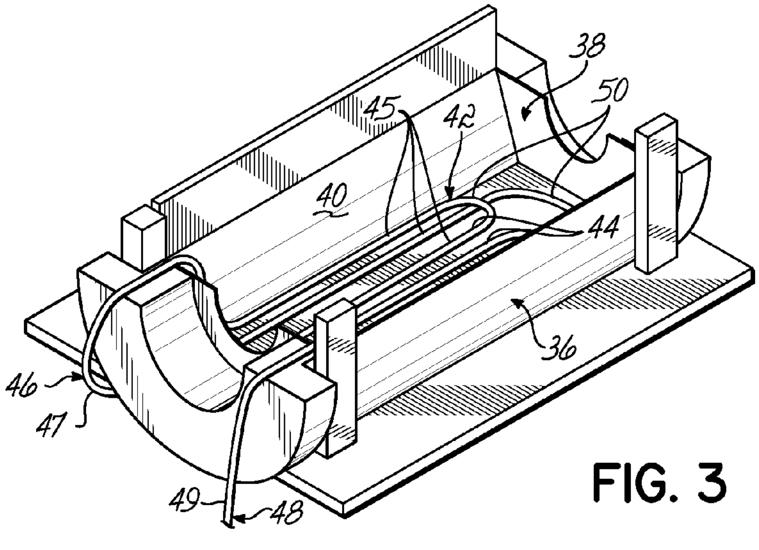
FIG. 3 is a top view of the gravure tray including a manifold, in accordance with the principles of the present invention.

More specifically, and referring to FIG. 3, the apparatus 37 includes a tray 36, in which the gravure sleeve is held and spins, (i.e., rotates within it), and a manifold 42 associated with the tray 36. The manifold 42 of the illustrated embodiment includes a series of pipes 44 having substantially parallel sections 45, interconnected by curved portions 50 at their ends, that are supplied with steam under pressure in order to be able to heat the wax 17 in order to cause the wax 17 to achieve a "printable" viscosity. As used herein, "printable," "print," "printing," or "printed," when referring to the wax formulation, merely refers to application of the wax 17 to less than substantially an entire first side 14 of the carrier 12. Further, while the manifold 42 of the illustrated embodiment includes pipes 44 of substantially parallel sections 45 and curved portions 50, it will be recognized by those skilled in the art that this particular configuration is not necessary. Rather, any configuration that provides a manifold to sufficiently heat the wax formulation will suffice.

Steam is supplied to the manifold 42 under high pressure, in the range of about 75-90 psi in one embodiment, in order to increase the temperature in the manifold 42. More specifically, in one embodiment, the temperature of the steam is increased to about 300° F. to 320° F. in the manifold 42, which is positioned near or at the bottom of the tray 36. The wax formulation is added into the tray 36, and so the manifold 42 provides heat to the wax 17, to increase the temperature of the wax 17 such that the wax material will achieve and remain at a printable viscosity. This wax temperature may be in the range of about 225° F. to about 300° F., although it will be recognized by those skilled in the art that a particular temperature or range of temperatures needed to achieve a printable viscosity may fluctuate, depending on the particular wax formulation used. The manifold 42 may be a separate component that is removably coupled to the tray 36. Alternatively, the manifold 42 may be permanently affixed to the tray 36.

In another aspect, the apparatus may include a heated mandrel 52 that is disposed in the interior 54 of the gravure sleeve 22. Thus, as the gravure sleeve 22 rotates, it picks up softened wax 17, and the heated sleeve 22, due to the mandrel 52, ensures that the wax 17 remains in a softened form as it rotates with the gravure sleeve 22 by maintaining the increased temperature of the wax 17.

Figure 4:
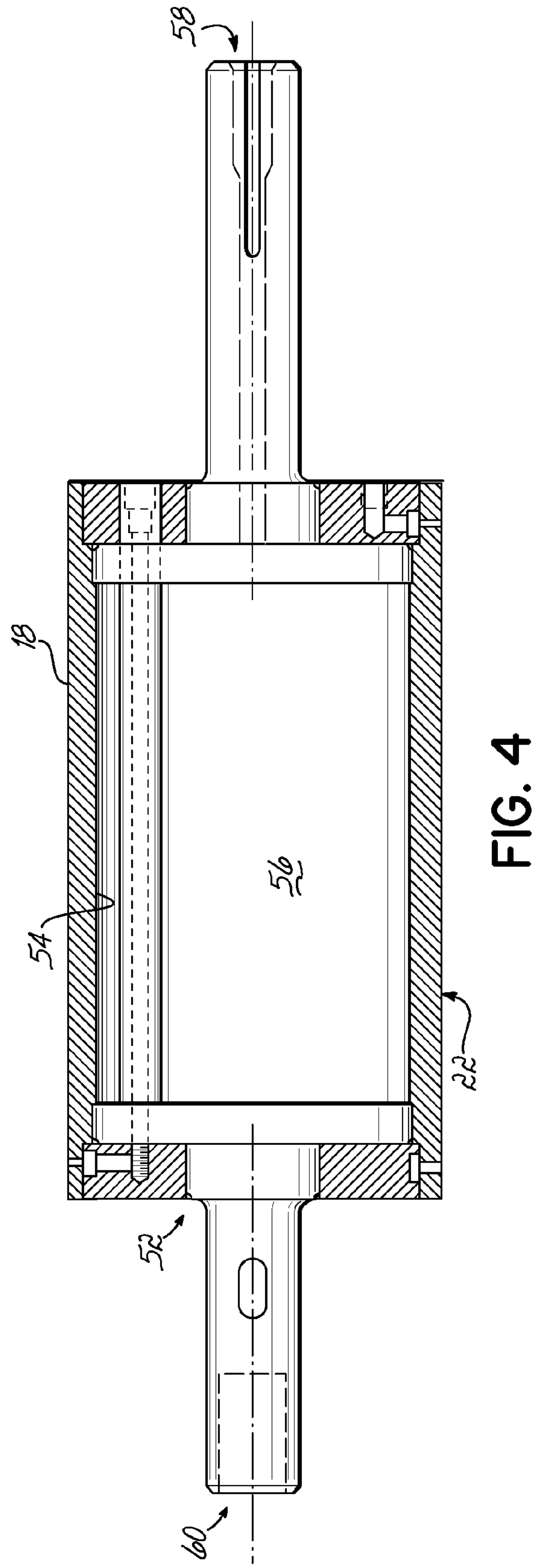
FIG. 4 is a cross-sectional view of a gravure sleeve and mandrel, in accordance with the principles of the present invention.

More specifically, and referring now to FIG. 4, the apparatus 37 may include a heatable mandrel 52 that is disposed in the interior 54 of the gravure sleeve 22. Thus, gravure-etched sleeves 22 are placed over and onto the heated mandrel 52. And thus, the gravure sleeve 22-heated mandrel 52 combination functions like a gravure cylinder. Such cylinders are well known to those skilled in the art. However, as described, the present sleeve 22 can be heated via the mandrel 52, as opposed to cylinders of the prior art. Gravure sleeves 22, which are placed over the mandrel 52, are etched based on the artwork for the particular contour 34 of the desired wax release layer 10. The heated mandrel 52 is supplied by high-pressure steam, within a core 56 thereof, in order to heat the mandrel 52, and thus the sleeve 22. The mandrel 52 includes at least one line (not shown) operatively coupled thereto that carries the steam and can withstand the high pressure. In one embodiment, this may be a half-inch, high-pressure hose. Thus, the mandrel 52 also includes a steam inlet 58, to which the steam line (not shown) is operatively coupled to form a passageway for steam to enter a cavity in the interior of the mandrel 52. The mandrel 52 may also include a steam outlet 60 to allow egress of steam from the mandrel 52. A second line (not shown) may be operatively coupled to this steam outlet 60 to transport steam from the mandrel 52.

Additionally, the apparatus may include a digital temperature controller (not shown), a drum heating coil (not shown), a drum, and an external gear hot-melt pump (not shown). These components are used to heat, and thus soften, the wax 17 prior to adding the wax 17 to the gravure tray 36. In one particular embodiment, the drum may be a 55 gallon steel drum, into which solid wax is placed, such as in the form of wax flakes. The drum heating coil may be a three zone heating unit that is wrapped around the exterior of the drum. The coil is then heated to increase the temperature in the interior of the drum, thereby heating, and softening, the wax 17. The drum heating coil is a standard heating coil as is well known to those skilled in the art. Additionally, as described above, the drum heating coil may be a three zone heating coil. Such a heating coil, as is known to those skilled in the art, may have heat supplied to different zones at different times. For example, when the drum is filled with wax flakes, all three zones of the drum heating coil may be heated in order to supply heat to the entire drum. As the now-softened wax is removed from the drum and transported to the tray 36, the upper zone may be shut off. As the level of wax continues to drop, the middle zone may be shut off. Should the drum be emptied, the lower zone may be shut off as well. Also, as more wax flakes are added to the drum, zones (such as the middle and upper zones) may be turned back on.

The digital temperature controller controls the heating of the coil and thus the temperature of the wax in the interior of the drum. In one embodiment, this temperature may be in the range of about 225° F. to about 300° F. Once the wax is softened, it may be transported through a heated line (not shown) and into the tray 36 by use of the external gear hot-melt pump. Thus, the wax is heated in the drum to a flowable and printable temperature and viscosity, and the manifold and heated mandrel maintain this temperature and viscosity in the tray 36 and on the sleeve 22, respectively.

Thus, the apparatus 37 of this aspect of the present invention includes a gravure printing unit for a rotary press, with a gravure sleeve 22 (which may include a heated mandrel 52) supplied with wax 17 from the manifold-heated gravure tray 36 and an impression roller 62, which lies in confronting relationship to the gravure sleeve 22, in the illustrated embodiment, to form a roller gap 64 therebetween. When the rotary press is running, a carrier 12, such as a sheet material, that is to be printed with wax 17 is passed through the roller gap 64, taking up wax 17 from the peripheral surface of the gravure sleeve 22. At the same time, the gravure sleeve 22 rotates in a specified direction opposite to that of the impression roller 62 and its rotational movement is composed of a leading, rotating sector from the printing unit to the roller gap 64 and a trailing rotating sector from the roller gap 64 to the printing unit.

As is well known to those skilled in the art, sleeves 22, particularly for use in gravure printing, may be made by mechanically working nickel sleeves 22 of relatively long axial length, polishing the sleeves 22 and balancing them. These sleeves 22, in one embodiment, may be about 0.009 inch thick. The sleeve 22, forming a carrier 12, has a copper layer (not shown) of about 0.002 inch to about 0.003 inch thickness applied to its circumference, typically by electrolytic deposition. This layer is smooth at the outer circumference. Thus, during deposition, it may be continuously compacted by a jewel roller (not shown), for example, and rolling with the sleeve 22 on which the copper layer (not shown) is being deposited. The final layer may be a chrome plating of about 5-8 microns thickness. After the customary photolithographic processes, the depressions within the outer layer (not shown) are etched in by a chemical etch. The depth of the depressions or engravings is generally about 0.02 mm to 0.03 mm, although they can be any desired depth. Such sleeves are commercially available from Stork Prints America, Inc. of Charlotte, N.C.

Alternatively, gravure sleeves 22 may be engraved mechanically. As is well know to those skilled in the art, in such mechanical engraving, a cutting tool (not shown) is used to engrave the cells on the surface of the gravure sleeve 22. The cutting tool (not shown) used to engrave the cells is normally a pointed diamond stylus, although other tools made of sapphire, carbide, cobalt steel, etc. may be used. Because the tool must make many cells in a sleeve 22, it must therefore be operated at very high speeds. For example, in a typical 140-line screen, as many as 20,000 cells per square inch may be required. In the engraving of a gravure sleeve 22, the image, pattern, or copy to be engraved is usually mounted on a copy sleeve 22, and the copy is optically scanned while the engraving is being performed. However, a copy may be scanned with the corresponding information stored in computer memory, processed, and later used to engrave a sleeve 22. As described above, the engraving machine may be an electromechanical engraver that uses a diamond stylus to engrave the sleeve 22. Alternatively, the machine may incorporate electronic means, such as electron beam or laser, for forming the cells within the sleeve 22. In either case, a series of cavities and/or lines are engraved into the sleeve surface 18. These cavities or lines are adapted to carry wax 17, which produces the size, shape, registration, etc. of the wax release layer 10 being printed.

In the case of the gravure printing unit, the printing sites of the gravure sleeve 22 forming the printing forms are recessed in the manner characteristic for gravure printing in the form of gravure cells of optimally different depth and/or area for holding the wax 17. The excess wax 17 of the gravure sleeve 22, supplied with wax 17 from the gravure tray 36, may be removed by a doctor blade (not shown) or a similar stripping device. As the carrier 12, which is to be printed, is passed through the roller gap 64 formed between the gravure sleeve 22 and the impression roller 62, the wax 17 is transferred out of the gravure cells and onto the carrier 12.

Referring now to FIGS. 2A-5, the gravure printing unit for a rotary press that is shown comprises a wax tray 36, which is filled with wax 17. A gravure sleeve 22, the printing peripheral surface of which has gravure cells for taking up printing wax 17, is mounted so that it can rotate above and at least partially within the wax tray 36 in such a way that, as it is rotating, while the press is running, it dips into the wax 17 so that the gravure cells are filled with the wax 17. Substantially perpendicularly above the gravure sleeve 22, an impression roller 62 is mounted rotatably for rotating opposite to the direction of rotation of the gravure sleeve 22. The impression roller 62 may include an elastic jacket (not shown) to form a rubber impression roller 62. The impression roller 62, together with the gravure sleeve 22, forms a roller gap 64 therebetween, through which the carrier 12, which is to be printed with wax 17, is passed during the operation of the press in order to take up printing wax 17 from the peripheral surface of the gravure sleeve 22.

The rotational movement of the gravure sleeve 22, that is, a revolution through 360°, can be thought of as being composed of a leading rotating sector 68 of 180° from the wax 17 in the gravure tray 36, beginning at a vertical plane 69 containing the axes of rotation of the sleeve 22 and the impression roller 62, in the direction of rotation of the sleeve 22, up to the roller gap 64 at the intersection with the vertical plane 69 and of a trailing, rotating sector 70, which starts at the end of the leading rotating sector 68 and ends in the direction of rotation of the sleeve 22 in the wax gravure tray 36 at the intersection with the vertical plane 69.

For carrying out the printing process, excess printing wax 17 on the leading rotating sector 68 of the gravure sleeve 22 may be stripped from the outer surface 18 thereof with the help of a doctor blade (not shown) or other stripping device, the stripping knife of which engages the outer surface 18, thereby leaving wax 17 in the etched regions 20. Afterwards, in the roller gap 64, the wax 17 is drawn from the gravure etched regions 20 of the outer surface 18 by means of the impression roller 62 exerting an elastic counterpressure and is taken up by the carrier 12, which is to be printed, for the transfer of the wax 17.

After leaving the roller gap 64, the etched regions 20 of the outer surface 18 on the trailing rotating sector 70 of the gravure sleeve 22 are substantially empty with the exception of possible wax residues.

Figure 5:
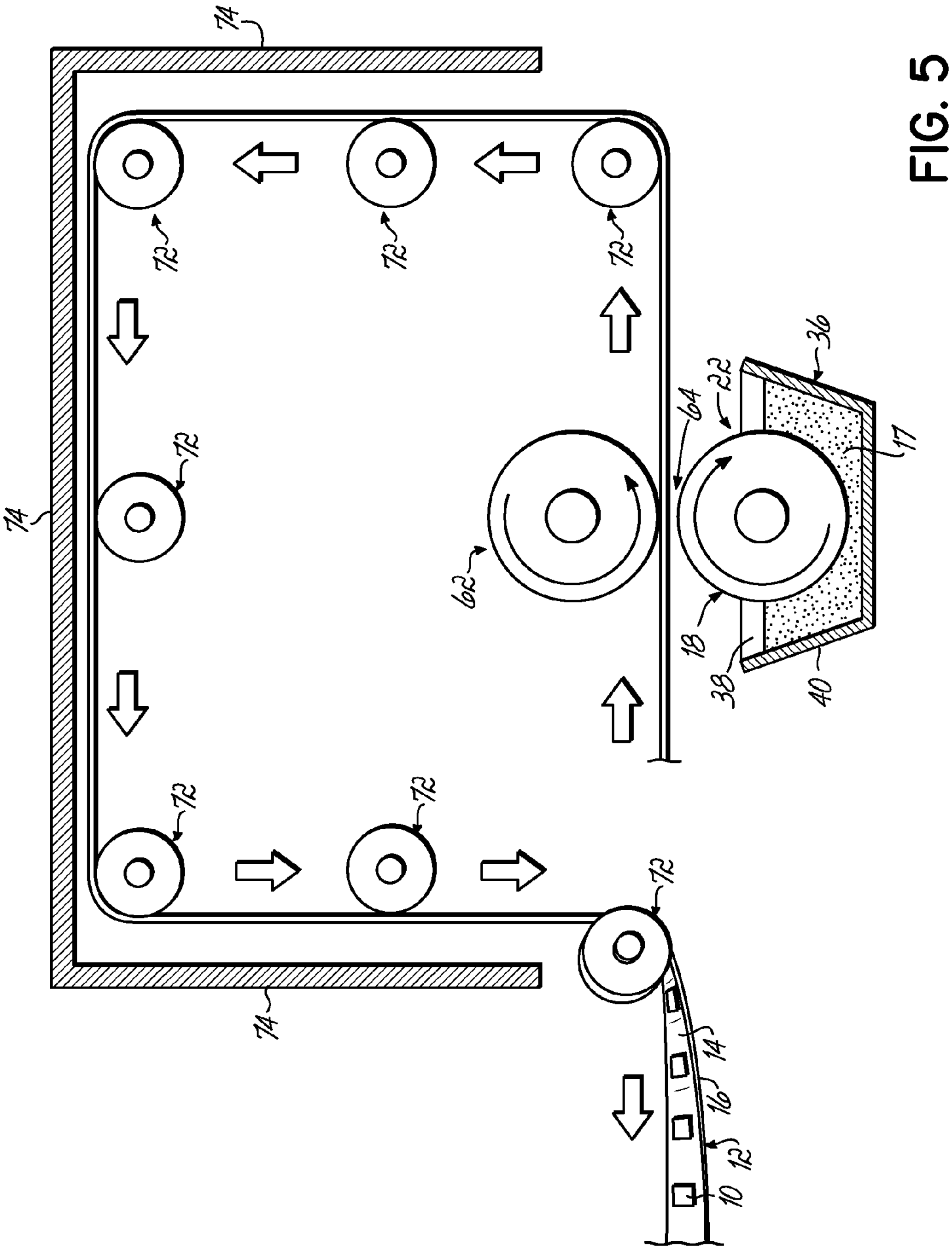
FIG. 5 is a perspective view, depicting the process of printing a wax release layer.

After leaving the roller gap 64, the carrier 12 has been printed with a contoured wax formulation with that wax formulation being oriented on the first side 14 of the carrier 12, with that first side 14 facing in a "downward" direction (as shown in the illustrated embodiment in FIG. 5). In order to re-orient the carrier 12 with the wax 17 on the first side 14 being oriented in an upright position, the carrier 12 then travels along a series of rollers 72 and through a dryer 74. This causes the carrier 12 to be re-oriented with the first side 14 in an upward orientation, while passing through the dryer 74 allows the wax 17 to be dried such that it retains the size, shape, configuration, or registration on the first side 14 of the carrier 12 as it was applied. While a dryer 74 is shown in the illustrated embodiment, those skilled in the art will recognize that a dryer is not necessary to the present invention. The wax simply must be dried to operate as the wax release layer 10. This may be achieved by allowing the temperature of the wax to drop so that the wax once again solidifies, for example. This may be accomplished by a dryer, by an apparatus used to lower the temperature of the wax, or by simply doing nothing to the wax other than moving it away form a source of heat (e.g., manifold and/or heated mandrel) such that it simply cools on its own and dries. Once the wax formulation has been dried and the carrier 12 sheet re-oriented, the carrier 12 may then pass to another label station (not shown), where the ink design layer 24 may be applied proximate to the contoured printed wax release layer 10. It will be recognized by those skilled in the art that the particular configuration of the rollers 62, dryer 74, etc. as shown in FIG. 5 is merely exemplary, and other configurations and set-up of the apparatus may be used.

In another aspect, the present invention provides a wax formulation for the wax release layer 10. The wax formulation generally includes a paraffin wax, an ester wax, a hydrocarbon resin, a microcrystalline wax, and an ethylene-vinyl acetate copolymer resin. In one embodiment, the wax composition comprises paraffin wax in an amount of from about 15% to about 30% by weight, ester wax in an amount of from about 15% to about 35% by weight, a hydrocarbon resin in an amount of from about 15% to about 50% by weight, a microcrystalline wax in an amount of from about 2% to about 8% by weight, and an ethylene-vinyl acetate copolymer resin in an amount of from about 4% to about 10% by weight. In one particular embodiment, the wax composition comprises paraffin wax in an amount of about 28% by weight, ester wax in an amount of about 26% by weight, a hydrocarbon resin in an amount of 35% by weight, a microcrystalline wax in an amount of about 8% by weight, and an ethylene-vinyl acetate copolymer resin in an amount of about 3% by weight. In this embodiment, the paraffin wax may be CSP140, commercially available from Glarus Specialty Products of South Carolina; the ester wax may be a Montan OP Wax, commercially available from Strohmeyer an Arpe Co. of New Jersey; the hydrocarbon resin may be Escorez 5320, commercially available from Exxon Mobil of Texas; the microcrystalline wax may be CSM Microblend 50, commercially available from Glarus Specialty Products of South Carolina; and the ethylene-vinyl acetate copolymer resin may be Elax 410, commercially available from DuPont of Texas.

As described above, the wax formulation of the above-described embodiments includes paraffin wax, microcrystalline wax, a hydrocarbon resin, and ester waxes. The particular components and composition of this wax formulation (as opposed to standard wax formulations presently used for flood coating carrier webs) allow the present wax formulation to be printed onto a carrier web in any particular size, shape, configuration, or registration. In particular, with present wax formulations, the viscosity is too high to allow that wax 17 to be pattern printed onto a carrier web. With the wax formulation of the present invention, one is able to print a wax formulation that is similar chemically to the existing formulation, but this can now be done at a lower viscosity and at a lower temperature, due to the formulation of the present invention.

More specifically, the wax formulation of one aspect of the present invention may include more paraffin and montan waxes than wax formulations of the prior art. As described above, one skilled in the art has to be able to get the wax formulation to a typical ink viscosity, in order for the wax 17 to be able to be printed onto a carrier 12. Thus, the wax formulation needs to be relatively thin. If the wax 17 is not thin, it will not print, it will not flow, and it will not level and perform as needed to form a contoured wax release layer 10. Since the wax release layer 10 is the foundation for the ink design layer 24, for example, then unless the wax 17 has a good printability, one will not be able to achieve a four-color process, print quality of the ink design layer 24. With the wax formulation of one aspect of the present invention, however, one can print four-color process on a printed wax release layer 10. If one were to try to do this with previous wax formulations, and at the temperatures disclosed herein (e.g., 225°-250° F.), one would not be able to get the wax 17 to stay localized to a particular portion of the carrier 12. And so, with previous wax formulations, one has to coat the entire first side 14 of the carrier 12. Again, because of the viscosity of previous wax formulations, previous carriers must be flood-coated, based on the procedures and the requirements of the equipment that was available prior to the present invention.

Further, due to the ability of label companies to print wax 17 at their own facilities (due to the use of gravure-type equipment), the present invention eliminates the need to have suppliers flood-coat and ship flood-coated carriers (along with an attendant decrease in costs). As described above in the Background section, label-makers have to reject quite a bit of the wax flood-coated carriers due to quality issues. The carriers have wrinkles, voids, and particulate matter. The amount of carriers suffering from these defects may be as high as 15-20%. Thus, the present invention eliminates that problem because the label-makers don't need wax flood-coated carriers anymore. Rather, label-makers only need the paper or other substance of the carrier 12, which does not suffer all the above-described defects. And when the label-maker constructs the label 26, it builds the wax release layer 10 in any configuration desired. Thus, the high costs due to having to order prewax-coated carriers and having them shipped are eliminated, thereby eliminating an increased cost, and eliminating the quality control issues raised by having to discard 15-20% of the carrier.

Further, due to the fact that only paper or film is now purchased by a label-maker, the label-maker can slit the paper or film as needed, which cannot be done with the wax flood-coated carriers. Flood-coated carriers have to be preslitted at the supplier's facilities. The supplier's coat wax across a 60-inch carrier web and then slit it to fit the printable web widths of the label-maker. With the present invention, rolls can be slit by the label-maker to supply printable widths as needed. Further, with current systems, suppliers also corona-treat the wax 17, so it will be more printable. However, due to the wax formulation of one aspect of the present invention, no secondary treatments to the wax 17 are necessary. Also, this allows a lower coat weight because the freshly printed wax formulation has sufficient surface energy (30-32 dyne/cm) to allow for direct printing.

Thus, another aspect of the present invention provides a label 26 including a carrier 12 and a wax release layer 10 confronting a surface of the carrier 12, wherein the wax release layer 10 confronts less than substantially the entire first side 14 of the carrier 12. The label 26 also may include an ink design layer 24 and, optionally, an adhesive layer (not shown) (alternatively, an adhesive may be incorporated into the ink of the ink design layer 24). Optionally, the label 26 may further include a protective layer (not shown) (not shown), such as a lacquer layer.

The ink design layer 24 provides graphics or other decoration to the label 26. The ink design layer 24 may be composed of conventional formulation known in the art for use in heat transferable labels of this type. For example, the ink design layer 24 may be composed of any conventional ink of any color. The ink may include a resinous binder base compatible with the ink pigment employed. The binder may be selected from a wide variety of conventional resinous bases such as polyvinyl chloride, acrylics, polyamides, and nitrocellulose. The ink may be applied by gravure coating methods or the like and then passed through several convective ovens for 3 to 5 seconds in order to dry off solvents and leave a dried ink design layer 24 over the dried wax release layer 10. In one specific embodiment, the ink design layer 24 may include various materials including, but not limited to, polyamide. Examples of polyamide inks suitable for the present invention may be found in U.S. Pat. Nos. 2,862,832, 2,989,413, 2,990,311, and 3,043,732, the disclosures of which are incorporated herein in their entireties. Also, polyester inks would be suitable for certain articles. Examples of such polyester inks may be found in U.S. Pat. No. 6,042,676, the disclosure of which is incorporated by reference herein in its entirety. In one embodiment, the color design print may be comprised of four colors.

Further, the label 26 may include an adhesive layer (not shown) positioned directly adjacent the ink design layer 24. However, this positioning is merely exemplary, and in alternate embodiments, another layer or layers may be positioned between the ink design layer 24 and the adhesive layer (not shown). The adhesive layer (not shown) or adhesive with the ink design layer 24 is adapted to contact and confront an article 32 to which the label 26 is applied, to adhere the label 26 thereto. Thus, the adhesive may include any materials known to those skilled in the art that provide a strong bond to articles, such as containers to which labels are applied. Such articles may be made from glass, polyethylene, polypropylene, polyethylene terephthalate, polycarbonate, etc., or a combination of such substances. It will be recognized by those skilled in the art that the listed materials of the article 32 are merely exemplary, and do not constitute an exhaustive list of materials from which such articles are made. The adhesive may suitably be composed of a thermoplastic polyamide adhesive. A preferred thermoplastic polyamide adhesive is the reaction product of a diamine with a dimerized fatty acid, such as that available under the trade name VERSAMID 900 series from Henkel Corporation of Minneapolis, Minn. This polyamide constituent may be combined with a nitrocellulose base.

As described above, the heat transfer label may optionally include a protective layer (not shown). For example, the protective layer (not shown) may be disposed between the wax release layer 10 and the ink design layer 24. The protective layer (not shown) may include various materials including, but not limited to, polyester. This protective layer (not shown) provides protection to the ink graphics apart from any protection provided by the wax release layer 10.

Figure 6:
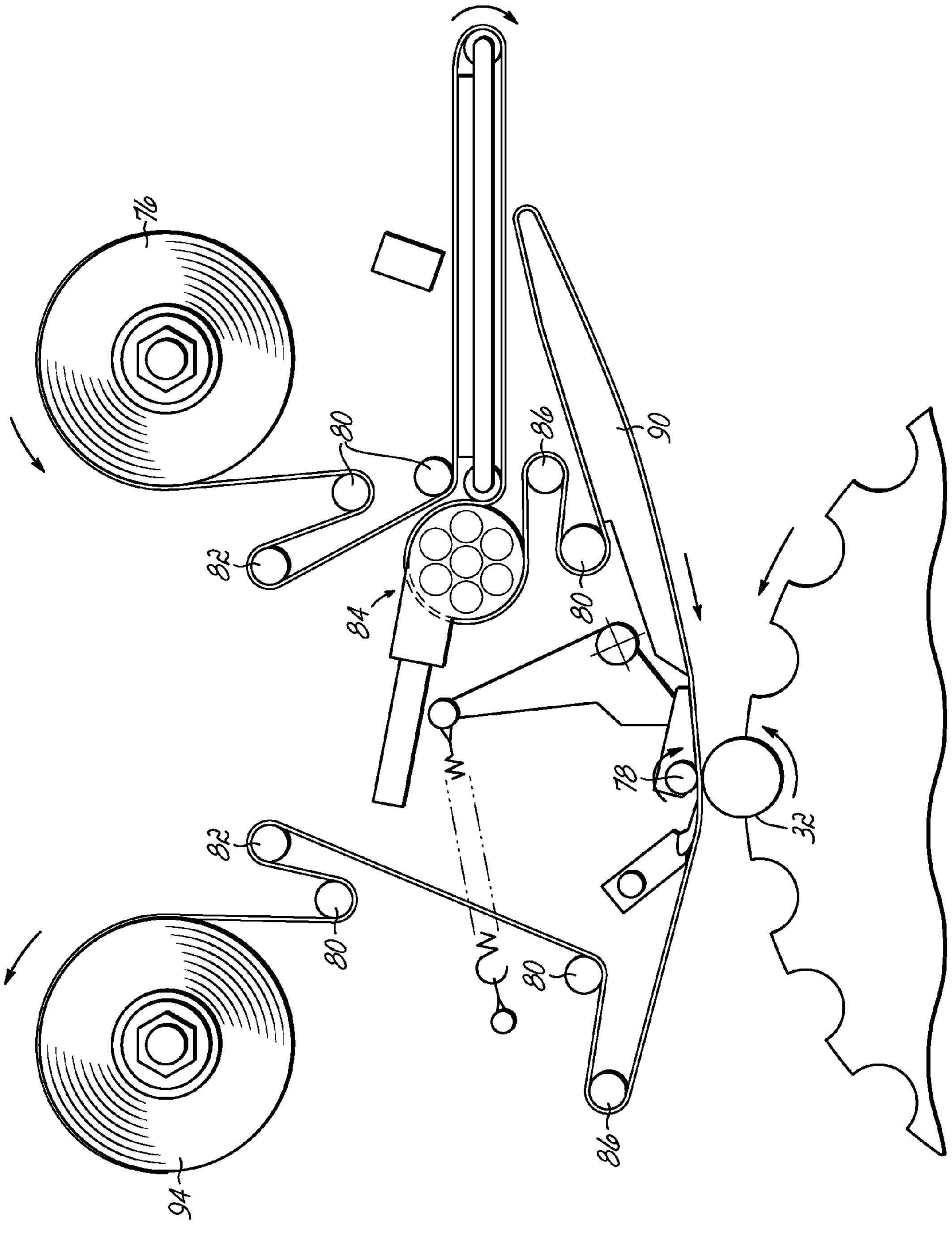
FIG. 6 is a schematic, showing the process of applying a heat transfer label to an article.

Once the label 26 has been prepared, it can be applied to an article 32 by techniques generally known to those skilled in the art. For example, and referring now to FIG. 6, the label 26 of the present invention may be applied to an article 32 as follows. In general, the labels 26 are carried on the carrier 12. The labels are releasable from the carrier 12, and the carrier 12 progresses from a feed reel 76 to a transfer roll 78. After being taken from a rotating feed reel 76, the carrier 12 will generally pass through a series of idler rolls 80, dancer rolls 82, metering rolls 84, and shuttle rolls 86 before passing across the transfer roll 78 of a decorator station, which is proximal to the articles being labeled. It will be recognized by those of skill in the art that the various rolls listed above are merely exemplary, and are not necessary to the principles of the present invention. Prior to reaching the transfer roll 78, the temperature of the carrier 12, and thus the label 26, may be increased by moving the carrier 12 in proximity to a label preheater 90. The increased temperature provided by the label preheater 90 may serve to facilitate release of the label 26 from the carrier 12. Each transfer roll 78 contacts the side of the carrier 12 opposite the label 26 and is rotatable as the carrier 12 is drawn across the transfer roll 78, and the label 26 contacts an article 32. Each decorating station and/or transfer roll 78 can be individually moved outwardly in a direction toward the article 32 to be labeled by means of a fixed cam, or by other means, to confront and press the carrier 12 and label 26 against the article 32 being labeled at the required time. After the label 26 has been applied to an article 32, the now empty carrier 12 may progress again through a series of idler, dancer, and shuttle rolls 82, 84, 86 to a take-up reel 94. It will be recognized by those skilled in the art that the particular number, type, and configuration of components described above are merely illustrative.

As various changes could be made in the above-described aspects and exemplary embodiments without departing from the scope of the invention, it is intended that all matter contained in the above description shall be interpreted as illustrative and not in a limiting sense.

What is claimed is:

1. A label, comprising:

a carrier; and at least one defined release pattern confronting a surface of the carrier, the at least one defined release pattern including wax;

wherein the at least one defined release pattern confronts less than substantially the entire surface of the carrier; and wherein the wax is present in the at least one defined release pattern in an amount of 32% or more by weight.

2. The label of claim 1, further comprising an ink design layer confronting the wax release layer.

3. The label of claim 2, wherein the ink design layer conforms to the size and shape of the wax release layer.

4. The label of claim 2, wherein the ink design layer includes an adhesive.

5. The label of claim 2, further comprising an adhesive layer confronting the ink design layer.

6. The label of claim 2, wherein the ink design layer includes at least one defined ink design.

7. The label of claim 6, wherein the at least one release pattern is contoured in that an outer edge of the at least one release pattern conforms to an outer edge of the at least one ink design.

8. The label of claim 7, wherein the at least one release pattern is larger in surface area than the at least one ink design.

9. The label of claim 7, wherein the at least one release pattern is the same size in surface area as the at least one ink design.

10. The label of claim 6, wherein the at least one release pattern is not contoured to an outer edge of the at least one ink design.

11. The label of claim 2, wherein the at least one release pattern includes voids.

12. The label of claim 2, wherein the at least one ink design includes voids.

13. The label of claim 1, further comprising a plurality of defined release patterns confronting a surface of the carrier.

14. The label of claim 1, wherein the wax comprises a wax formulation including:

a paraffin wax;

an ester wax; and a microcrystalline wax.

15. A label, comprising:

a carrier; and at least one defined release pattern confronting a surface of the carrier, the at least one release pattern including wax;

wherein the at least one release pattern confronts less than substantially the entire surface of the carrier;

wherein the release pattern consists essentially of multiple waxes, said multiple waxes including a paraffin wax, an ester wax, and a microcrystalline wax; and wherein the paraffin wax is in an amount of 15% to 30% by weight, the ester wax is in an amount of 15% to 35% by weight, and the microcrystalline wax is in an amount of 2% to 8% by weight.

16. The label of claim 15, wherein the paraffin wax is in an amount of 28% by weight, the ester wax is in an amount of 26% by weight, and the microcrystalline wax is in an amount of 8% by weight.

* * * * *

UNITED STATES PATENT AND TRADEMARK OFFICE
CERTIFICATE OF CORRECTION

PATENT NO. : 8,501,316 B2
APPLICATION NO. : 13/591308
DATED : August 6, 2013
INVENTOR(S) : Jean-Paul Laprade et al.

It is certified that error appears in the above-identified patent and that said Letters Patent is hereby corrected as shown below:

On the Title Page

Item (57), Column 2,
Abstract, second last line reads “less that” and should read -- less than --.

In the Specification

Column 4,
Line 51 reads “lines” and should read -- line --.

Column 12,
Lines 16-17 read “(not shown) (not shown),” and should read -- (not shown), --.

Signed and Sealed this
Eleventh Day of March, 2014

Michelle K. Lee
*Deputy Director of the United States Patent and Trademark Office*